US012394301B2

(12) United States Patent
Arora et al.

(10) Patent No.: US 12,394,301 B2
(45) Date of Patent: Aug. 19, 2025

(54) LIVE STATUS NOTIFICATION OF RESPONSE PERSONNEL ACTIONS TO BUILDING OWNER/OPERATORS

(71) Applicant: Honeywell International Inc., Charlotte, NC (US)

(72) Inventors: Abhishek Arora, Bangalore (IN); Arvind Mathanagopalan, New Haven, CT (US); Jayaprakash Meruva, Bangalore (IN); Kiran Singam, Bangalore (IN); Rajeshbabu Nalukurthy, Bangalore (IN); Vipin Das E K, Kannur (IN)

(73) Assignee: Honeywell International Inc., Charlotte, NC (US)

( * ) Notice: Subject to any disclaimer, the term of this patent is extended or adjusted under 35 U.S.C. 154(b) by 191 days.

(21) Appl. No.: 17/718,554

(22) Filed: Apr. 12, 2022

(65) Prior Publication Data
US 2022/0335812 A1  Oct. 20, 2022

Related U.S. Application Data

(60) Provisional application No. 63/175,348, filed on Apr. 15, 2021.

(51) Int. Cl.
*G08B 25/04* (2006.01)
*H04W 4/12* (2009.01)

(52) U.S. Cl.
CPC .............. *G08B 25/04* (2013.01); *H04W 4/12* (2013.01)

(58) Field of Classification Search
CPC ...... G08B 25/04; G08B 27/001; G08B 19/00; G08B 25/08; H04W 4/12
See application file for complete search history.

(56) References Cited

U.S. PATENT DOCUMENTS 5,061,916 A  10/1991 French et al.
9,426,638 B1 *  8/2016 Johnson ............... G08B 25/016
(Continued)

FOREIGN PATENT DOCUMENTS

CN  104851256 A  8/2015
CN  106415618  2/2017
(Continued)

OTHER PUBLICATIONS

Extended European Search Report for related European Application No. 22167858.4, mailed Sep. 6, 2022 (11 pgs).
(Continued)

*Primary Examiner* — James J Yang
(74) *Attorney, Agent, or Firm* — Brooks, Cameron & Huebsch, PLLC

(57) ABSTRACT

Devices, systems, and methods for live status notification of central station actions to building owner/operators are described herein. One system includes a building owner/operator communication device, an alarm system at a building having a control panel component and one or more alarm system device components, a central monitoring station configured to execute executable instructions to: receive an event alarm signal from an alarm system component, send a response request signal to a response facility, receive a response request signal reply indicating that response facility personnel will respond to the building, receive event response update data from the response facility personnel via a response personnel communication device, and send the event response update message to the building owner/operator communication device.

20 Claims, 4 Drawing Sheets

(56) References Cited

U.S. PATENT DOCUMENTS

| | | | |
|---|---|---|---|
| 10,255,780 B1 | 4/2019 | Wittenberg | |
| 10,319,210 B2 | 6/2019 | Kurniawan | |
| 10,348,575 B2 | 7/2019 | Sundermeyer et al. | |
| 10,503,921 B2 | 12/2019 | Evans | |
| 10,872,518 B2 | 12/2020 | Allen | |
| 2009/0045942 A1* | 2/2009 | Schurter | A62C 99/00 340/539.11 |
| 2009/0121860 A1 | 5/2009 | Kimmel et al. | |
| 2015/0317809 A1* | 11/2015 | Chellappan | H04W 4/90 455/404.1 |
| 2016/0203123 A1* | 7/2016 | Kozloski | G06F 40/30 704/224 |
| 2016/0373910 A1* | 12/2016 | Moss | G06F 9/453 |
| 2017/0103491 A1 | 4/2017 | Bora | |
| 2017/0186309 A1 | 6/2017 | Sager et al. | |
| 2019/0191278 A1 | 6/2019 | Singh | |
| 2020/0175843 A1* | 6/2020 | Aslam | G08B 25/08 |
| 2020/0286353 A1 | 9/2020 | Jafri et al. | |
| 2022/0122438 A1* | 4/2022 | Miller | G08B 21/0297 |

FOREIGN PATENT DOCUMENTS

| | | |
|---|---|---|
| CN | 107274623 A | 10/2017 |
| CN | 109155796 | 1/2019 |
| CN | 110114794 | 8/2019 |
| JP | 4723813 B2 | 7/2011 |
| JP | 5876371 B2 | 3/2016 |
| JP | 2020166497 A | 10/2020 |
| KR | 20050100491 A | 10/2005 |

OTHER PUBLICATIONS

Ya'Acob, et al., "Geographical Information System (GIS) Map for Fire and Rescue Application"; Jurnal Teknologi, Wireless Communication Technology (WiCoT), Faculty of Electrical Engineering, May 26, 2016 (6 pgs).

* cited by examiner

EVENT DETAILS WITH LIVE STATUS MOBILE APP — 321

| | |
|---|---|
| ⚠ MASS_NOTIFICATION_TROUBLE | 👆 — 336 |

334 ↗

EVENT DESCRIPTION
FIRE ACTIVATION

SITE & BUILDING
HIGH SCHOOL CAMPUS
MAIN BUILDING

DEVICE DETAILS
N1L1D29
PHOTO DETECTOR
MUSIC ROOM 1

EVENT DATE, TIME
16 JUN 2020
10:20AM

OBSCURATION LEVEL
NA

DIRECT CONNECT WITH CENTRAL STATION

CENTRAL STATION
CENTRAL STATION XYZ

EVENT RECEIVED
01 SEP 2020, 17:27:25

CURRENT STATUS
FIRE BRIGADE DISPATCHED AT 17:30:00

VIEW EVENT TIMELINE — 338

VIEW DEVICE HISTORY — 340

Fig. 3

LIVE STATUS NOTIFICATION OF RESPONSE PERSONNEL ACTIONS TO BUILDING OWNER/OPERATORS

PRIORITY INFORMATION

This application claims priority to U.S. Provisional Application No. 63/175,348, filed Apr. 15, 2021, the contents of which are incorporated herein by reference in its entirety.

TECHNICAL FIELD

The present disclosure relates to devices, systems, and methods for live status notification of response personnel actions to building owner/operators.

BACKGROUND

Large facilities (e.g., buildings), such as commercial facilities, office buildings, hospitals, and the like, may have an alarm system that can be triggered during an emergency situation (e.g., a fire), for instance, to warn occupants to evacuate. For example, an alarm system may include a control panel (e.g., a fire control panel) within the building and a plurality of event devices (e.g., hazard sensing devices, such as fire detectors, smoke detectors, carbon monoxide detectors, carbon dioxide detectors, other harmful chemical detectors, audio-visual monitoring devices, etc.) located throughout the facility (e.g., on different floors and/or in different rooms of the facility) that can sense a hazard event occurring in the facility and provide a notification of the hazard event to the occupants of the facility via alarms or other mechanisms.

In conventional alarm monitoring systems, once an alarm event signal reaches the central monitoring station, based on the type of alarm the monitoring personnel take appropriate actions and inform to authorized emergency responders. For example, in case of a fire alarm event signal, the personnel at the central monitoring station would call a fire station and inform them that a fire alarm event signal has been received from the alarm system of a facility. Or, in the case of a security breach the personnel would inform a nearby police department, etc. The actions that the central monitoring station personnel take are recorded in their central monitoring station system, but the progress that they are making to address the alarm is not known to the building owner/building facility manager.

Typically, the progress actions like—informed emergency responders, emergency responders started to target location, emergency responders have reached the location, emergency responders are in action to suppress incident, emergency responders completed activities and have left the area, etc. These detailed actions are captured manually and the information is maintained in the central monitoring station system, but these in-between progress status details are not known to the building owner/building facility manager.

BRIEF DESCRIPTION OF THE DRAWINGS

FIG. 3 is an illustration of a display screen provided on a user interface showing a device status summary, generated in accordance with one or more embodiments of the present disclosure.

DETAILED DESCRIPTION

Figure 1:
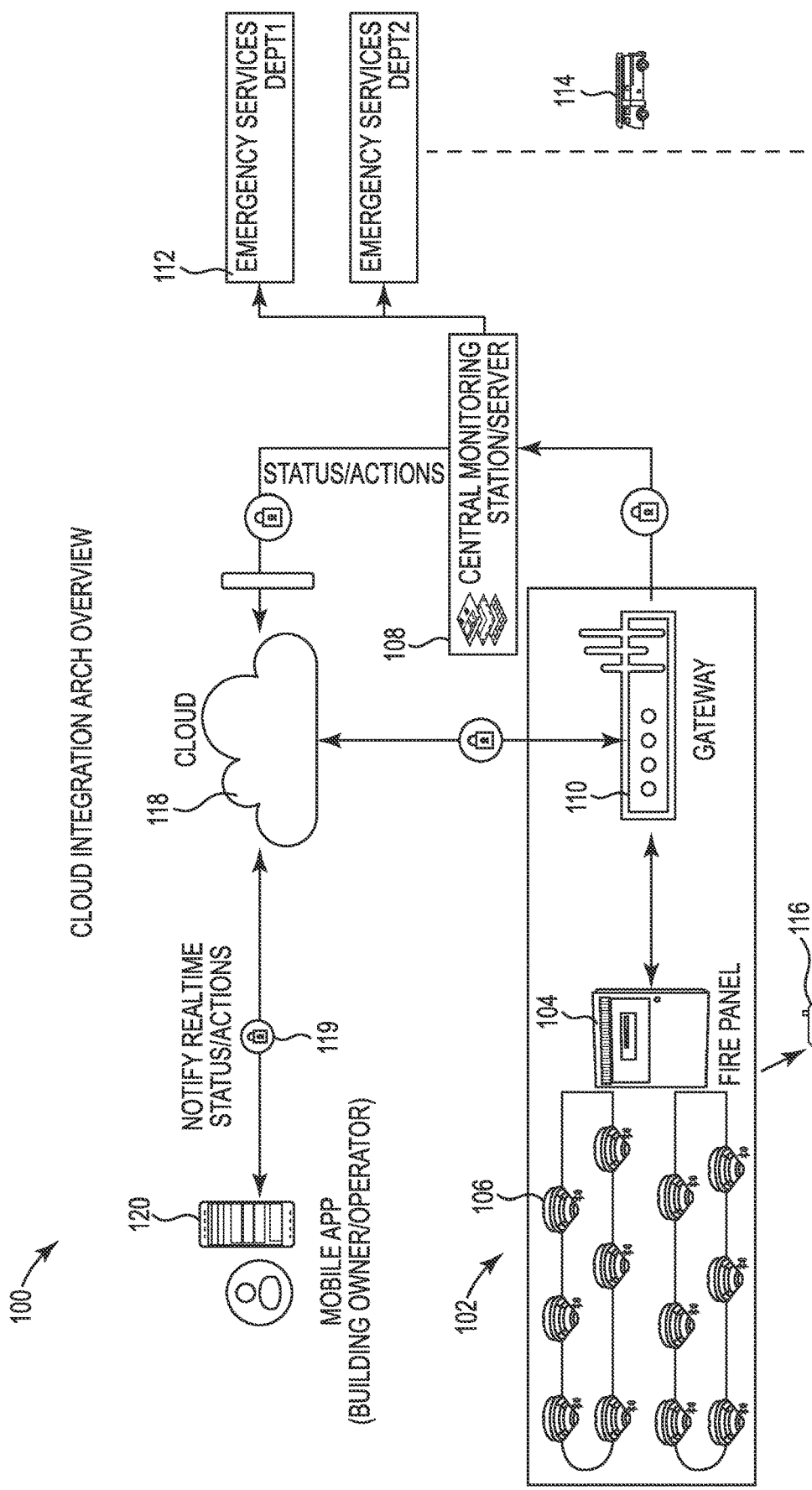
FIG. 1 is an example of a response personnel status system for use, in embodiments in accordance with one or more embodiments of the present disclosure.

Devices, systems, and methods for live status notification of response personnel actions to building owner/operators are described herein. Presently, there is no mechanism in an alarm system to notify a building owner/facility manager, data is only being passed between the central station and emergency/first responders. In the present disclosure, the response personnel status system includes a communication link between the central station and a remote server (e.g., cloud server).

Through use of the embodiments described herein, real time status information can be provided to building owners/operators indicating the in-between update data. As used herein, in-between update data is data describing a status condition that is in between the event alarm signal and a signal that the event has been handled. Information provided can, for example, be: a type of incident happened (fire, chemical release, security situation), based on this incident the central station has performed a particular action, the current action being performed, the next action to be performed, the third action to be performed, among other information.

By having the communication connection with the building owner/operator, for example, via the connection to the central monitoring station, the responding personnel can also receive information about the building that may not be available to the central monitoring station, such as the best door to enter, potential areas that may be dangerous (e.g., areas under construction), if a prior arranged path is still the preferred path or if an alternative path should be followed, etc. In some embodiments, the building owner/operator can then return answers, for example, to the central monitoring station that can then be forwarded to the responding personnel (e.g., emergency response personnel, fire fighters, police officers, security personnel, etc.).

Other information to be communicated can be floor of building or area specific. For example, the building owner/operator can provide a number and/or location of fire extinguishers, a number and/or location of exits, live status updates of the building condition while the responders are in route (e.g., SW corner of building smoking, may be fully engulfed when you arrive, use entry point #2 as entry #1 may be on fire), among other relevant details. Information received from each party (building owner/operator, responder) can be taken in by the central monitoring center as spoken words and transcribed, for example, automatically by transcription software and then the text can be sent to the appropriate party (building owner/operator, responder).

As discussed above, devices, systems, and methods for live status notification of response personnel actions to building owner/operators are described herein. One system includes a building owner/operator communication device, an alarm system at a building having a control panel component and one or more alarm system device components, a central monitoring station configured to execute executable instructions to: receive an event alarm signal from an alarm system component, send a response request signal to a response facility, receive a response request signal reply indicating that response facility personnel will respond to the building, receive event response update data from the response facility personnel via a response personnel communication device, and send the event response update message to the building owner/operator communication device.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 402 in FIG. 4.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is an example of a response personnel status system for use, in embodiments in accordance with one or more embodiments of the present disclosure. In the illustrated embodiment, the response personnel status system 100 includes an alarm system 102 within a building 116, a central monitoring station having at least one computing device 108, a remote server (e.g., cloud server) 118 and a building owner/operator communication device 120.

The central monitoring station is also connected to one or more response services providers 112 that can dispatch response personnel (e.g., fire fighters) to the building 116 in response to an event alarm signal being generated by the control panel 104 within the alarm system 102. An event alarm signal is generated in response to data from one or more alarm system devices 106 (e.g., smoke detectors) within the alarm system indicating that an event (e.g., a fire) may be occurring. The central monitoring station may be staffed by employees of the provider of the alarm system and they may not know specific details of each building they are monitoring, but rather, are charged with alerting appropriate response personnel based on the type of response needed and coordinating the response to the building to address the event that is occurring at the building.

The alarm system can be any system that is used to monitor events that will affect occupants of the building. As shown in FIG. 1, the alarm system illustrated is a fire alarm system and includes a number of alarm system devices 106 and a control panel for managing the operation of the alarm system and its devices.

As used herein, the term "control panel" refers to a device to control components of an alarm system of a facility (building). For example, the control panel 104 can be a fire control panel that can receive information from event devices 106 and determine whether a hazard event is occurring or has occurred.

The control panel 104 can be connected to the number of alarm system devices 106. As used herein, the term "alarm system device" refers to a device that can receive an input relating to an event. Such an event can be, for instance, a hazard event such as a fire. For example, an alarm system device can receive an input relating to a fire occurring in the facility. Such alarm system devices 106 can be a part of an alarm system of the facility and can include devices such as fire sensors, smoke detectors, heat detectors, carbon monoxide (CO) detectors, other chemical detectors, or combinations of these; interfaces; pull stations; input/output modules; aspirating units; and/or audio/visual devices, such as speakers, sounders, buzzers, microphones, cameras, video displays, video screens, among other types of alarm system devices.

These alarm system devices 106 can be automatic, self-test devices, such as smoke detectors, heat detectors, CO detectors, and/or others. Such self-test devices can include mechanisms that generate aerosols, heat, carbon monoxide, etc. and sense these items as appropriate to the type of device being tested in the device to test the performance of the device. This can, for example, be to test the event device's thermal, chemical, and/or photo sensing capabilities.

The alarm system 102 can also include an edge/gateway device 110. The gateway device acts as a pass through device for communicating between the alarm system 102 in the building and the central monitoring station 108 and other components of the response personnel status system 100 that are at remote locations (i.e., outside the building. The gateway device can also include edge intelligence functionality that detects when an event alarm condition exists at one alarm system device and collects data from other devices nearby the one indicating the event alarm condition. This information can be beneficial to, for example, provide a fuller picture of the incident.

For instance, the edge intelligence can indicate that there are four smoke detector devices (e.g., devices 106) to the south of the device indicating the alarm that have smoke levels that have slightly increased which indicates that to central monitoring personnel which direction a fire may be spreading and that those detector devices are operational for monitoring the status of the situation.

The gateway device can also provide other important functions. For example, during commissioning of the alarm system, the gateway device can provide a functionality that detects quality of connection of the alarm system devices and the gateway device and can report weak connections to technicians during the commissioning process or during operation of the system. It can identify what connections are problematic and identify the location of the issue, in some instances, to direct the technician to the problem. In some embodiments, the gateway device can also identify trends of problems, for example, where it indicates that every few weeks or months, a problem occurs in a certain area which may prompt a technician to investigate activities in that space that may be triggering the recurrent problem.

As shown in the example of FIG. 1, the response personnel status system can have various connections secured (illustrated by lock icons 119 at various places within the system 100) to reduce or eliminate unauthorized connections to the system. For example, in some embodiments, a security protocol can be utilized wherein the real time status information can only be made available for those parties that enter, for example, a user name and password, authorizing the system to provide such information to a party. Such embodiments can also be customizable such that parties with different authorization levels can access different information. These levels and the information types that are made available to each level can be customized, for example, by the building owner/operator or alarm system provider at the time the system is configured or once the system is set up.

In the embodiments of the present disclosure, a gateway device of an alarm system at a facility (building) reports event alarm signals to one or more central monitoring servers. These servers may be on premise (within the facility) or, as shown in the example of FIG. 1, off premise (at a remote location from the alarm system components including the gateway device).

From there, the event alarm signals are reported to the appropriate central monitoring station that includes administrators that, as discussed above, coordinate activities to respond appropriately based on the type of event that is occurring. For example, a fire event would need a fire based response that would likely include alerting a fire station to send trucks and contacting medical personnel, if injuries seem likely. For a security issue, security personnel and/or the police would be contacted. The central monitoring servers are connected back to one or more alarm systems on site and/or remote (cloud) servers.

Any actions that are taken by central monitoring personnel or emergency response personnel can be recorded in memory on their servers (this can be accomplished through manual entry by an administrator and/or automatically via executable instructions stored in memory and executable to record the actions, for example, triggered by receipt of an event alarm signal) and those actions are communicated back to alarm system servers, for example, through cloud to cloud interactions from the central monitoring servers to one or more alarm system servers. In some embodiments, these actions can be tagged with a respective alarm identifier. The alarm identifier can be used to locate the event within the building and/or determine one event from another (e.g., a building may have a security event and a fire event happening at the same time).

Actions of response personnel like: a fire truck having been dispatched, on the way to building, reached location, suppression is in progress, successfully resolved incident, can be sent by response personnel to the central monitoring station, for example, through a software application on a mobile device, such as a phone, or any other appropriate communication mechanism. Such actions can be referred to as phases of handling an event and the process of handling an event can be viewed as a phase-wise process where on phase is completed and another phase begins until the event has been handled and all phases have been completed.

The alarm system servers can, then, report these actions to facility managers/building owners that may not be at the central monitoring station, for example, through an alarm system mobile software application on the building owner/operator's phone or other mobile device. Providing phase-wise, real time progress details from a central monitoring station to building owners/operators through mobile application via, for example, push notification/SMS/e-mail or through graphical user interface will provide significant benefits over present concepts.

The response personnel status system can also allow workflow to be defined for different types of alarms, and when progress of one stage is moved to another stage, the graphical user interface can show the current stage details in the user interface. In this way, the building owners/operators can quickly ascertain the status of the event without having to navigate through the mobile application.

The remote server can also include artificial intelligence functionality that can, for example, inform the receiver of the information that a similar incident happened on a particular date, the period of time that it took to respond to that previous incident, the current time it has taken to respond to the present incident, based on data regarding one or more prior incident's data the estimated time to completely resolve the present incident. This could be achieved, for example, by applying an inference model. This can be beneficial, for instance, by informing the building owner/manager of the timeframe, so that they know how long they have to perform any incident related actions they may have to do.

Figure 2:
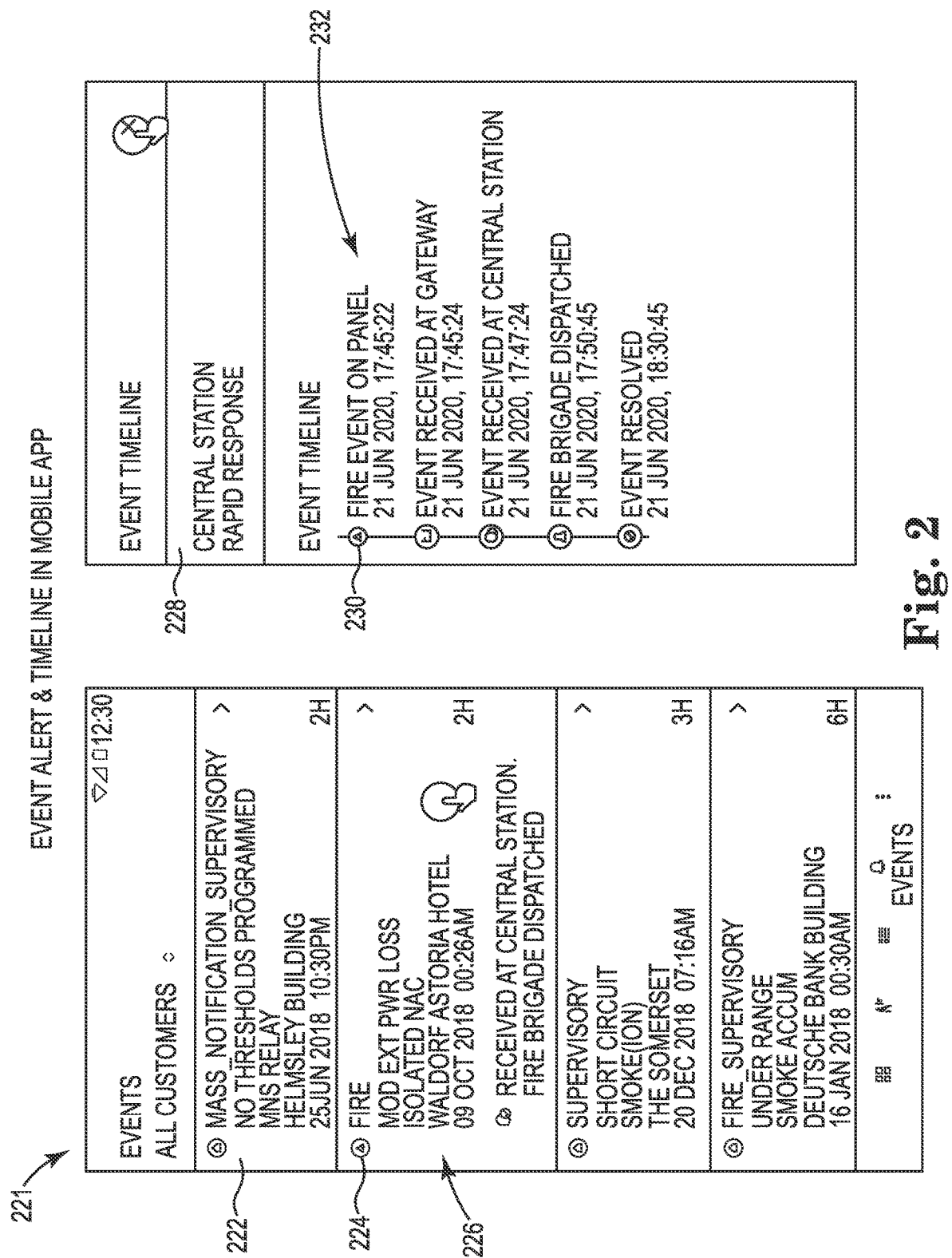
FIG. 2 is an illustration of a display screen provided on a user interface showing a summary of events occurring within the response personnel status system, generated in accordance with one or more embodiments of the present disclosure.

FIG. 2 is an illustration of a display screen provided on a user interface showing a summary of events occurring within the system, generated in accordance with one or more embodiments of the present disclosure. The left side of FIG. 2 illustrates a display of multiple events provided on a user interface on the building owner/operator's communication device. The display 221 shows four example events 222 with each event including a description 226 with a variety of information about the event.

For example, the information shown includes: type of event (mass notification supervisory, fire, supervisory, fire supervisory), sensed data received that indicated an event (no threshold, mod ext pwr loss, short circuit, under range), the type of issue that may result from the event (MNS relay, isolated NAC, smoke, smoke accum), the location (Hemsley Building, Waldorf Astoria, The Somerset, Deutsche Bank Building), the date and time of each event, and/or status information (received at central station—fire brigade dispatched) if the event is a current event that is unresolved. In some embodiments, the displayed information can also include a status identifier 224 that can allow a viewer to quickly ascertain the status of the events. This could, for example, be different icons for different status conditions or phases or different colors among other suitable identifier types.

The right side of FIG. 2 is an illustration of a display screen provided on a user interface showing an event activity timeline, generated in accordance with one or more embodiments of the present disclosure. In this illustration, the viewer has selected the second event lighted on the left side display illustration (selection illustrated by the hand with pointing finger and circle, indicating the viewer clinked on the area of the second event with the cursor). On the right side illustration, the display presents a timeline of the event phases 230 with some being finished and others yet to be undertaken. The display also has an indicator area that indicates the type of response being provided (central station—rapid response). The event response phases can be represented by different identifiers (e.g., colors, symbols, text) to help the viewer understand whether the response phase has happened, is happening, or is yet to occur.

FIG. 3 is an illustration of a display screen provided on a user interface showing a device status summary, generated in accordance with one or more embodiments of the present disclosure. In this example, the summary on the display 321 includes a complete history of the event response can be seen by any stakeholder (building owner/operator, response personnel, central monitoring station personnel) in the event response process at a time. In this example, the display provides the category of event 334, event description 336 including type of event, location, device indicating an event is occurring, event date and time, other details, and event timeline and current status information. Detailed timeline information can be viewed by clicking the view event timeline text at 338. The device history can be accessed by clicking the button 340. The device history can include any information that can be useful to diagnose an issue. For example, suitable information can include previous event information regarding events occurring that triggered an alarm signal, maintenance history, etc.

Figure 4:
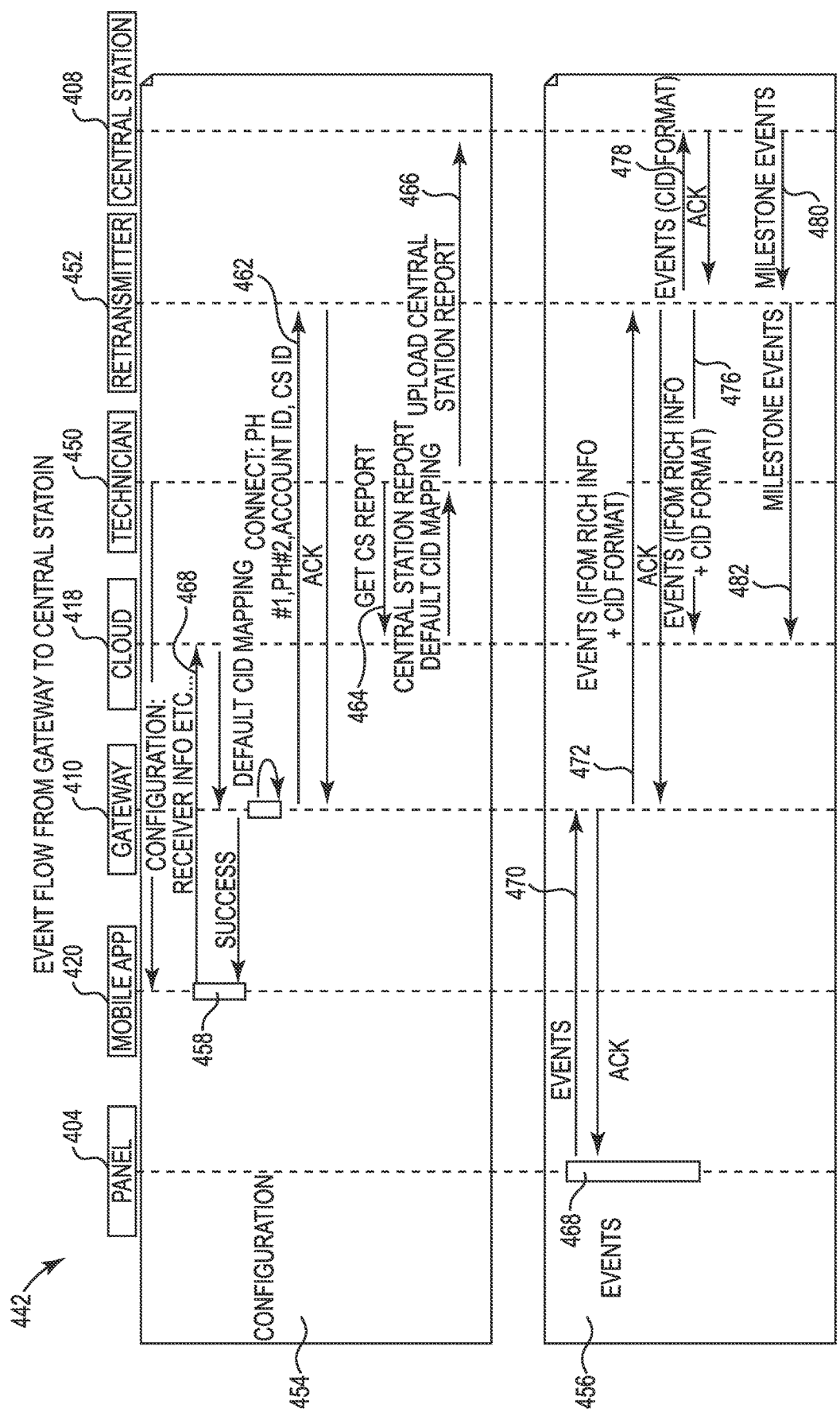
FIG. 4 is an illustration of an event flow between a gateway and a central station, generated in accordance with one or more embodiments of the present disclosure.

FIG. 4 is an illustration of an event flow between a gateway device and a central monitoring station, generated in accordance with one or more embodiments of the present disclosure. In this illustration, communication flows 442 are shown for a configuration process 454 and an event alarm signal process 456.

In the configuration process, a technician 450 initiates the configuration process via the building owner/operator communication device 420 (mobile device with a specialized mobile software application constructed to provide the functionalities described herein). In the illustrated process, the building owner/operator communication device sends a request to the remote server 418 for receiver information to link the building owner/operator communication device to the response personnel status system at 460. At 462, the gateway device 410 sends authentication information to a transmitter 452 to make sure the user of the response personnel status system is authorized. The technician, then, requests central station reporting information from the remote server to initiate an upload of report data to the central monitoring station server 408.

With respect to the event alarm signal process, the control panel 404 of the alarm system identifies an event 468 and initiates an event alarm signal 430 that is sent to the gateway device 410. The gateway device 410, then forwards the event alarm signal to a transmitter 452 that forwards the signal to the central monitoring station server 408. The central monitoring station server 408 then sends recording information 480/482 to the remote server for storage thereon for keeping a record of events and for estimating event timeframes as discussed herein.

There are several computing devices used for various functions in the response personnel status system. Each of these computing devices (e.g., gateway device, control panel, remote server, building owner/operator communication device, central monitoring station server) include a processor and memory which can function as described below. Also described below are other items that may be provided on such computing devices, such as user input and output components.

The memory can be any type of storage medium that can be accessed by the processor to perform various examples of the present disclosure. For example, the memory can be a non-transitory computer readable medium having computer readable instructions (e.g., executable instructions/computer program instructions) stored thereon that are executable by the processor in accordance with the present disclosure.

The memory can be volatile or nonvolatile memory. The memory can also be removable (e.g., portable) memory, or non-removable (e.g., internal) memory. For example, the memory can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory is illustrated as being located within the computing device, embodiments of the present disclosure are not so limited. For example, memory can also be located internal to another computing resource (e.g., enabling computer readable instructions to be downloaded over the Internet or another wired or wireless connection).

A computing device can also include a user interface. For example, the user interface can display the embodiments illustrated in FIGS. 2 and 3.

A user (e.g., operator) of computing device can interact with the computing device via the user interface. For example, the user interface can provide (e.g., display and/or present) information to the user of the computing device, and/or receive information from (e.g., input by) the user of computing device. For instance, in some embodiments, user interface can be a graphical user interface (GUI) that can provide and/or receive information to and/or from the user of the computing device. The display can be, for instance, a touch-screen (e.g., the GUI can include touch-screen capabilities). Alternatively, a display can include a television, computer monitor, mobile device screen, other type of display device, or any combination thereof, connected to mobile device and configured to receive a video signal output from the mobile device.

As an additional example, user interface can include a keyboard and/or mouse the user can use to input information into the computing device. Embodiments of the present disclosure, however, are not limited to a particular type(s) of user interface.

User interface can be localized to any language. For example, user interface can utilize in any language, such as English, Spanish, German, French, Mandarin, Arabic, Japanese, Hindi, etc.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system for live status notification of response personnel actions to building owner/operators, comprising:
   a building owner/operator communication device;
   an alarm system at a building having a control panel component and one or more alarm system device components;
   a central monitoring station having,
      a user interface;
      a memory; and
      a processor configured to execute executable instructions stored in the memory to:
         receive an event alarm signal from the control panel component generated in response to receiving data from the one or more alarm system device components indicating that a hazard event is occurring;
         send a response request signal to a response facility;
         receive a response request signal reply indicating that response facility personnel will respond to the building;
         receive event response update data from the response facility personnel via a response personnel communication device;
         wherein the central monitoring station receives a request for information known only by the building owner/operator from the response personnel communication device and directed to the building owner/operator communication device, the information selected from the group including: a best door to enter the building, potential areas that may be dangerous, whether a prior arranged path is still a preferred path or if an alternative path should be followed, a number of fire extinguishers, location of fire extinguishers, a number of exits, a location of exits, real-time status updates of the building condition while the response personnel are in route;
         wherein the central monitoring station directs the request to the building owner/operator communication device;
         wherein the central monitoring station receives the requested information known by the building owner/operator from the building owner/operator communication device and directs the received information to the response personnel communication device; and
         send real time status information of the hazard event and the event response update data to the building owner/operator communication device including event response phases corresponding to actions taken associated with resolving the hazard event.

2. The system of claim 1, wherein the building owner/operator communication device is a mobile device or a personal computing device.

3. The system of claim 1, wherein the alarm system further includes a gateway device that sends and receives data with the control panel and the central monitoring station.

4. The system of claim 3, wherein the gateway device also sends and receives data with the building owner/operator communication device.

5. The system of claim 3, wherein the gateway device also sends and receives data with a remote server.

6. The system of claim 5, wherein the remote server also sends and receives data with the building owner/operator communication device.

7. The system of claim 5, wherein the remote server also sends and receives data with the central monitoring station.

8. The system of claim 1, wherein the system further includes a remote server that sends and receives data with the building owner/operator communication device and the central monitoring station.

9. A system for live status notification of response personnel actions to building owner/operators, comprising:
   a building owner/operator communication device;
   an alarm system at a building having a control panel component and one or more alarm system device components;
   wherein the alarm system includes a gateway device having,
      a user interface;
      a memory; and
      a processor configured to execute executable instructions stored in the memory to:
         receive an event alarm signal from the control panel component generated in response to receiving data from the one or more alarm system device components indicating that a hazard event is occurring;
         send a response request signal to a response facility;
         receive a response request signal reply indicating that response facility personnel will respond to the building;
         receive event response update data from the response facility personnel via a response personnel communication device;
         wherein the gateway device receives a request for information known by the building owner/operator from the response personnel communication device and directed to the building owner/operator communication device, the information selected from the group including: a best door to enter the building, potential areas that may be dangerous, whether a prior arranged path is still a preferred path or if an alternative path should be followed, a number of fire extinguishers, location of fire extinguishers, a number of exits, a location of exits, real-time status updates of the building condition while the response personnel are in route;
         wherein the gateway device directs the request to the building owner/operator communication device;
         wherein the gateway device receives the requested information known by the building owner/operator from the building owner/operator communication device and directs the received information to the response personnel communication device; and
         send real time status information of the hazard event and the event response update data to the building owner/operator communication device including event response phases corresponding to actions taken associated with resolving the hazard event.

10. The system of claim 9, wherein the gateway device analyzes historical event data to determine a projected duration of one phase of a current event occurring at the building.

11. The system of claim 10, wherein the gateway device sends the projected duration to the building owner/operator communication device.

12. The system of claim 10, the gateway device sends the projected duration to a central monitoring station.

13. The system of claim 10, wherein the gateway device sends the projected duration to a remote server in communication with the building owner/operator communication device.

14. The system of claim 13, wherein the remote server sends the projected duration to the building owner/operator communication device.

15. A system for live status notification of response personnel actions to building owner/operators, comprising:
a building owner/operator communication device;
an alarm system at a building having a control panel component and one or more alarm system device components;
a response personnel communication device;
a remote server having,
    a memory; and
    a processor configured to execute executable instructions stored in the memory to:
        receive an event alarm signal from the control panel component generated in response to receiving data from the one or more alarm system device components indicating that a hazard event is occurring;
        send a response request signal to a response facility;
        receive a response request signal reply indicating that response facility personnel will respond to the building;
        receive event response update data from the response facility personnel via the response personnel communication device;
        wherein the remote server receives a request for information known by the building owner/operator from the response personnel communication device and directed to the building owner/operator communication device, the information selected from the group including: a best door to enter the building, potential areas that may be dangerous, whether a prior arranged path is still a preferred path or if an alternative path should be followed, a number of fire extinguishers, location of fire extinguishers, a number of exits, a location of exits, real-time status updates of the building condition while the response personnel are in route;
        wherein the remote server device directs the request to the building owner/operator communication device;
        wherein the remote server receives the requested information known by the building owner/operator from the building owner/operator communication device and directs the received information to the response personnel communication device; and
        send real time status information of the hazard event and the event response update data to the building owner/operator communication device including event response phases corresponding to actions taken associated with resolving the hazard event.

16. The system of claim 15, wherein the event response update data is received from a central monitoring station.

17. The system of claim 15, wherein the event response update data includes a request for building owner/operator information.

18. The system of claim 17, wherein the processor is configured to execute executable instructions stored in the memory to receive building owner/operator information from the building owner/operator communication device.

19. The system of claim 17, wherein the processor is configured to execute executable instructions stored in the memory to receive building owner/operator information from a remote server.

20. The system of claim 15, wherein the processor is configured to execute executable instructions stored in the memory to receive building owner/operator information and send the building owner/operator information to the response personnel communication device.

* * * * *